Sept. 30, 1952     C. BRETSCHNEIDER     2,612,231
INDIVIDUALLY SWINGABLE DRIVEN AXLE
Filed June 28, 1947     3 Sheets-Sheet 1
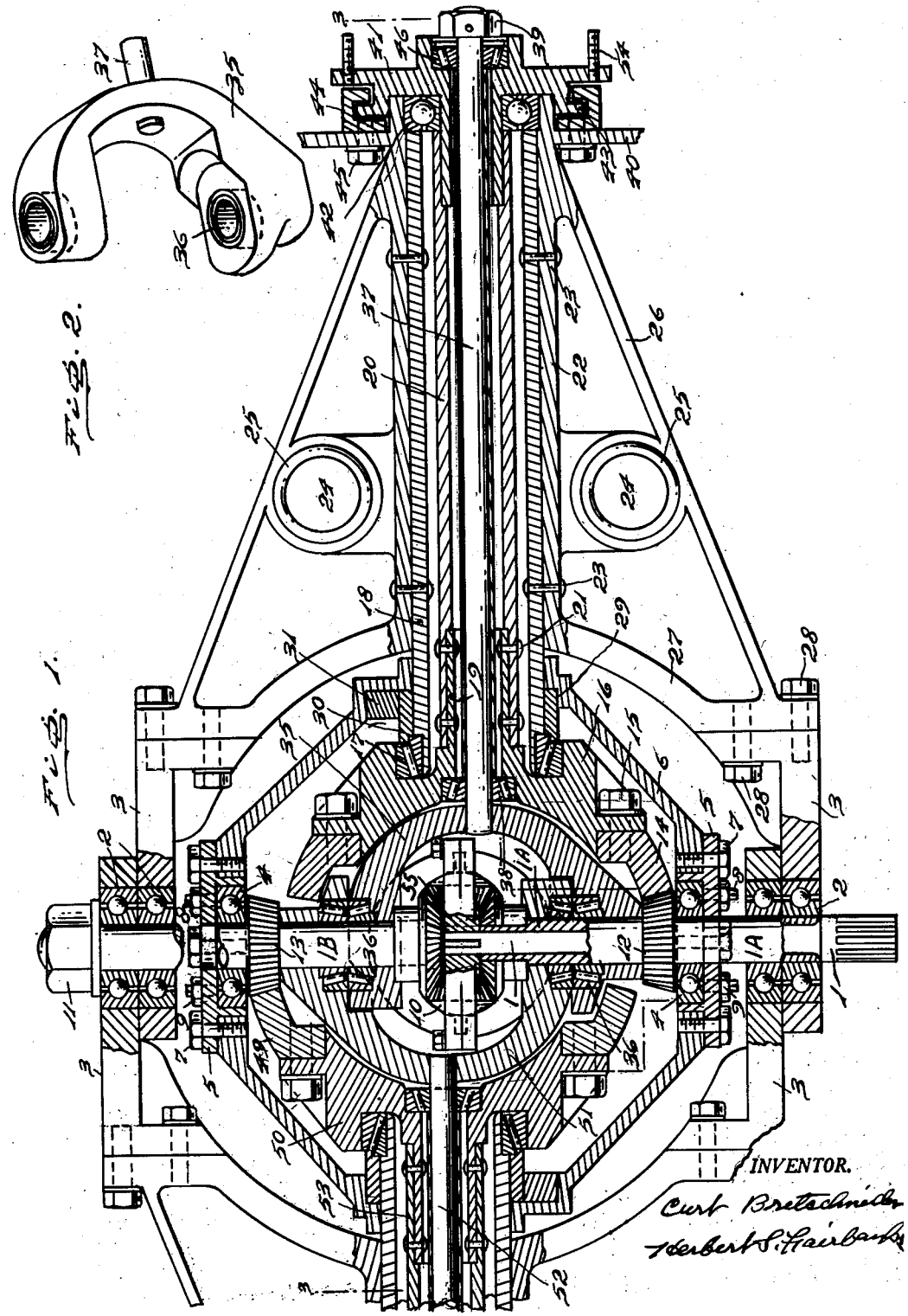

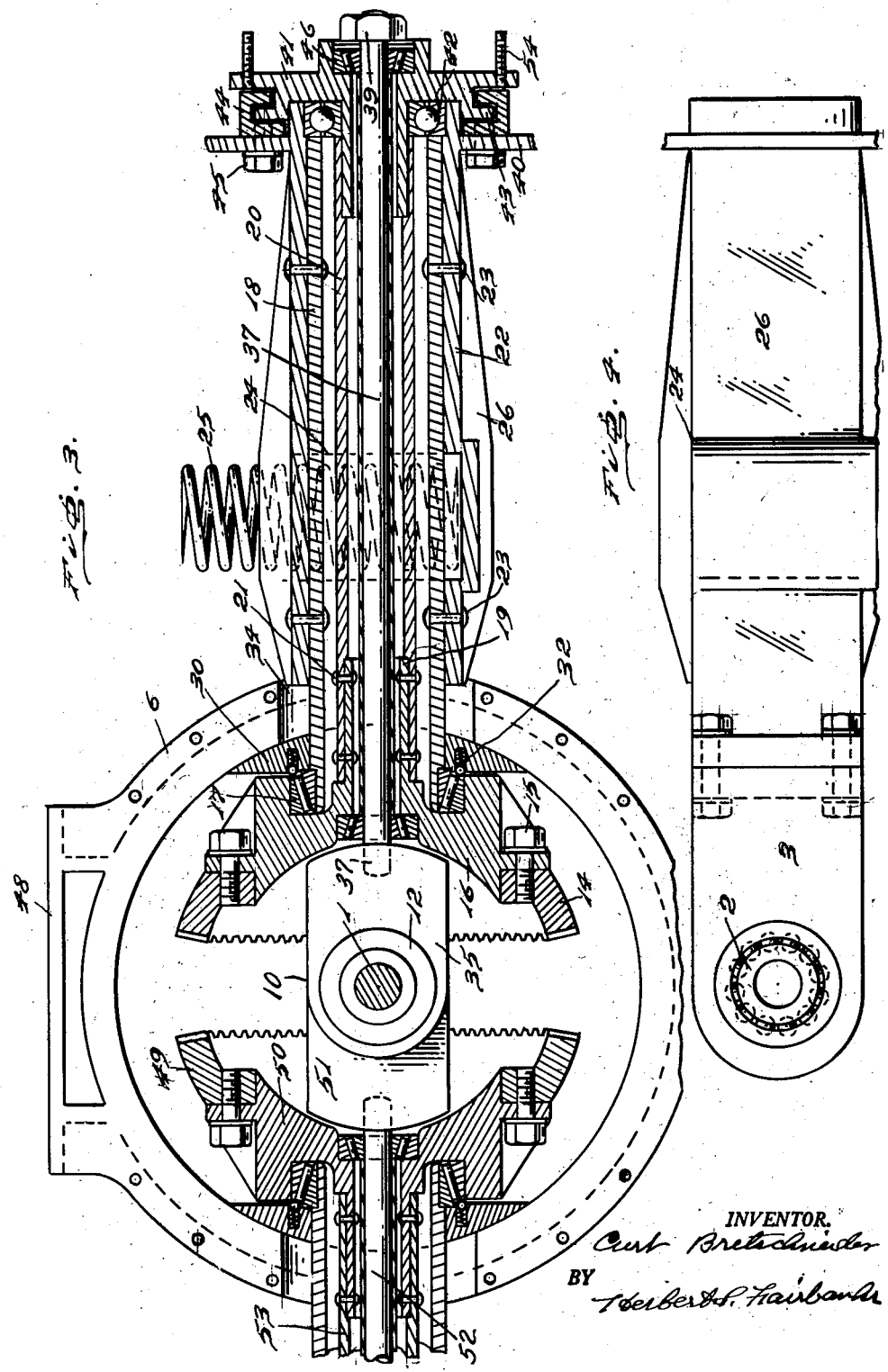

Sept. 30, 1952　　　C. BRETSCHNEIDER　　　2,612,231
INDIVIDUALLY SWINGABLE DRIVEN AXLE
Filed June 28, 1947　　　　　　　　　　3 Sheets-Sheet 3
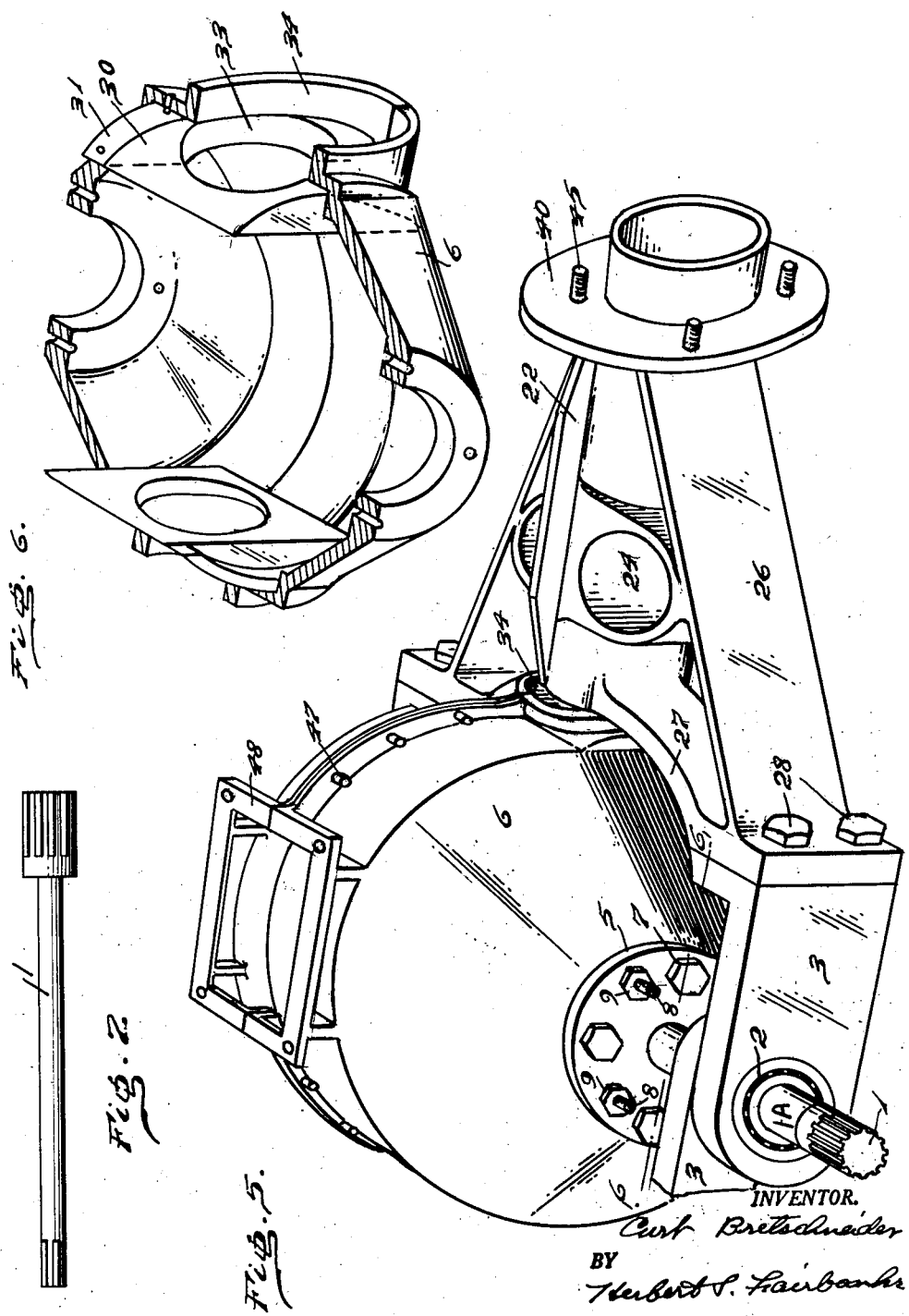
INVENTOR.
Curt Bretschneider
BY
Herbert P. Fairbanks Patented Sept. 30, 1952

2,612,231

UNITED STATES PATENT OFFICE 2,612,231

INDIVIDUALLY SWINGABLE DRIVEN AXLE

Curt Bretschneider, Philadelphia, Pa.

Application June 28, 1947, Serial No. 757,713

5 Claims. (Cl. 180—73)

The object of this invention is to devise a novel differential drive for motor vehicle which provides independent springing for the driving wheels, thereby eliminating unsprung weight, and which entirely eliminates the necessity of employing universal joints, thus reducing the friction and increasing the power delivered to the driving wheels.

A further object is to obtain a straight line drive shaft, with ease of assembly.

A further object is to eliminate a large number of machined parts which have heretofore been deemed necessary.

With the foregoing and other objects in view as will hereinafter clearly appear, my invention comprehends a novel differential drive.

It further comprehends a novel differential drive wherein the cooperating parts are constructed and arranged in a novel manner.

For the purpose of illustrating the invention, I have shown in the accompanying drawings a preferred embodiment of it which in practice will give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a sectional plan view of a differential drive embodying the invention.

Figure 2 is a perspective view of a bearing bracket.

Figure 3 is a vertical section, taken substantially on line 3—3 of Figure 1.

Figure 4 is a side elevation of a portion of a frame.

Figure 5 is a perspective view of a portion of the housing.

Figure 6 is a sectional perspective of Figure 5, taken substantially on line 6—6 of Figure 5.

Figure 7 is a plan view of the drive shaft in detached position.

Similar numerals of reference indicate corresponding parts.

Referring to the drawings:

A drive shaft 1 passes through a shaft 1A, which latter is mounted in one of end members 3 in a bearing 4 in a housing 6. The forward end of the shaft 1 is splined at 55 to the spider of the differential gearing 10 to drive the latter. The differential gearing, in addition to driving shaft 1A, also drives a shaft 1B mounted in a ball bearing 4 in an end member 3.

The shaft 1A has a gear 12 fixed to it and meshing with a ring gear 14 fixed by bolts 15 to a carrier 16, which latter has a roller bearing 17 between it and an outer tube 18.

The shaft 1B has a gear 13 fixed to it and meshing with a ring gear 49, as will hereinafter be explained. An adjusting bolt 11 is at the outer end of the shaft 1B.

The ball bearings 4 mounted in closures 5 are adjusted by bolts 8 fixed to the bearings and provided with nuts 9. Closures 5 are secured to housing 6 by bolts 7.

The carrier 16 has a tubular extension 19 which telescopes into the inner end of an inner tube 20 and is fixed to such tube by fastening devices 21.

The tube 18 extends into an apertured portion of a frame 22 and is fixed therein by fastening devices 23. The frame 22 has pockets 24 to receive coil springs 25. The frame has laterally converging, reinforcing side bars 26 connected at their rear ends to cross bars 27, the latter being fixed to the end members 3 by fastening devices 28. It will thus be clear that the frame 22 is loosely mounted on the driven shafts 1A and 1B.

The housing 6 is recessed at 29 to receive a spacer 30 and a locking member 31 therefor. Spring pressed balls 32 are disposed between the spacer 30 and the roller bearing 17, see Figure 3. The spacer 30 has an opening 33, see Figure 6, in which the outer tube 18 fits, and the housing 6 has an elliptically shaped or oval opening 34 which provides clearance for the rise and fall of the frame 22.

As seen in Figure 1, a bifurcated bearing bracket 35 has its arms provided with roller bearings 36 cooperating with the driven shafts 1A and 1B. A rod or axle 37 has its inner end fixed to the bearing bracket and cooperates with a roller bearing 38 in the carrier 16, and said rod passes through the inner tube 20 and is threaded at its outer end to receive a nut 39.

The wheel mounting

The frame 22 has near its outer end an annular flange 40. A bearing member 41 has a sleeve which telescopes into the outer end of the inner tube 20 and carries a ball bearing 42 between the outer end of the tube 20 and the bearing member 41. The bearing member 41 has an inwardly spaced, outwardly extending annular flange 43 with which a split locking ring 44 cooperates, said flange 43 being grooved to receive the ring 44. The locking ring 44 is fixed to the flange 40 of the frame by bolts 45. The outer end of a bearing member 41 is recessed to receive a roller bearing 46 through which the rod 37 passes.

For ease of assembly, the housing 6 is centrally split to form sections secured together by fastening devices 47. The upper end of the housing has an arrangement of bars 48 adapted to be connected to the frame of an automobile.

Since the left portion of the driving mechanism is identical with that of the right driving mechanism hereinbefore described, a detailed description of the construction and operation is believed to be unnecessary. The gear 13 meshes with a gear 49 of the same construction and operation as the gear 14, the gear 49 being secured to a carrier 50. A bearing bracket 51 corresponds to the bracket 35 and has a rod 52 and its adjuncts and a wheel mounting.

Two wheels are directly driven, the carriers 16 and 50 being revolved to turn tubular axles 20 and 53. The bearing member 41 serves as a mounting for a wheel, and is provided with studs and nuts 54 to secure the wheel to its mounting.

The operation will now be apparent to those skilled in this art and is as follows:

Assuming that the parts are in their assembled condition and the housing secured to the frame of an automobile, the springs 25 bearing against the automobile frame tend to move the frames 22 downwardly, the upward turning or swinging of the frames being resisted by the springs 25.

The shaft 1 is driven by the engine and drives the differential 10 to provide the proper travel of the wheels in their movement around a curve in the well known manner. The gears 12 and 13 driven by the differential gearing drive their ring gears, carriers and tubular axles to effect the revolution of the bearing members 41 and the wheels mounted thereon.

The frames and their adjuncts are loosely mounted on the shafts 1A and 1B as a unit, and their upward movement is resisted by the coil springs. It is to be understood that conventional shock absorbers may be mounted in the same manner as in the so-called knee-action mounting of steering wheels for automobiles.

The herein described construction of differential has a minimum of parts and a minimum of unsprung weight.

The clamping rings 44 and their bolts 45 serve as a safety device to prevent a wheel being detached in case the nut 39 should become detached from a rod 37.

Having thus described the invention, what I claim as new and desire to secure by Letters Patent is:

1. In a differential driving mechanism, a housing, a drive shaft mounted therein, a differential driven by said drive shaft, shafts driven by said differential, a bifurcated bracket mounted on each of said driven shafts, an axle fixed at one end to each of said brackets, a plurality of ring gears, each ring gear intergeared with a corresponding one of said driven shafts, a carrier within the housing for each ring gear, an inner tube fixed to each carrier and receiving the corresponding axle, an outer tube for each carrier, each of said outer tubes mounted on a corresponding one of said carriers, a frame having an antifriction mounting on said driven shafts and fixedly connected with said outer tube, and a wheel mounting member connected to each of said inner tubes and disposed in bearing relation with the other end of each of said axles.

2. The construction specified in claim 1, wherein each of said outer tubes has a clearance with the respective housing, a spacer in each housing associated with and through which the corresponding outer tube passes, the spacer having an outer wall conforming in contour to the inner wall of the housing, and means in said housing tending to maintain the spacer in contact with the inner wall of the housing.

3. In a differential driving mechanism, a housing, a drive shaft mounted therein, a differential driven by said drive shaft, shafts driven by said differential, a bracket having a mounting on said shaft sections, an axle fixed at one end to said bracket, a ring gear intergeared with with one of said driven shafts, a carrier for said ring gear having an antifriction bearing for said axle, an inner tube fixed to said carrier, an outer tube on which said carrier has an antifriction mounting, a frame having an antifriction mounting on said driven shafts and fixed to said outer tube, and a wheel mounting member connected to said inner tube and disposed in bearing relation with the other end of the axle.

4. In a differential driving mechanism, a housing, a drive shaft mounted therein, a differential driven by said drive shaft, shafts driven by the differential, a bracket having an antifriction mounting on said driven shafts, an axle fixed at one end to said bracket, a ring gear intergeared to one of said driven shafts, a carrier for the ring gear, an inner tube fixed to the carrier and receiving said axle, an outer tube on which the carrier is mounted, a frame fixed to the outer tube and mounted on said driven shafts exteriorly of said housing, and a wheel mounting member connected to said inner tube and disposed in bearing relation with the other end of the axle.

5. In a differential drive, a housing, a drive shaft mounted therein, a differential driven by the drive shaft, shafts driven by the differential, brackets mounted on said driven shafts, axles fixed to said brackets, ring gears in the housing, one of which is intergeared with one driven shaft and the other of which is intergeared with the other driven shaft, carriers for the ring gears, inner tubes fixed to the carriers, outer tubes on which the carriers are mounted and extending through the housing with a clearance, frames mounted on said shaft sections exteriorly of the housing and fixed to the outer tubes, and wheel mounting members connected to said inner tubes and disposed in bearing relation with the other ends of said axles.

CURT BRETSCHNEIDER.

REFERENCES CITED

The following references are of record in the file of this patent:

UNITED STATES PATENTS

| Number | Name | Date |
| --- | --- | --- |
| 1,847,749 | Bussien | Mar. 1, 1932 |
| 2,007,670 | Zubaty | July 9, 1935 |
| 2,090,893 | Ledwinka | Aug. 24, 1937 |
| 2,344,380 | Wilfert et al. | Mar. 14, 1944 |

FOREIGN PATENTS

| Number | Country | Date |
| --- | --- | --- |
| 151,921 | Great Britain | Jan. 12, 1922 |
| 398,140 | France | May 27, 1909 |
| 486,854 | Germany | Nov. 26, 1929 |